United States Patent
Rydin et al.

(10) Patent No.: US 8,672,665 B2
(45) Date of Patent: Mar. 18, 2014

(54) VACUUM BAG WITH INTEGRAL FLUID TRANSFER CONDUITS AND SEALS FOR RESIN TRANSFER AND OTHER PROCESSES

(75) Inventors: Richard W. Rydin, Chapel Hill, NC (US); Robert J. Scrima, Jr., Henderson, NV (US)

(73) Assignee: ARJR Group, LLC, Henderson, NV (US)

( * ) Notice: Subject to any disclaimer, the term of this patent is extended or adjusted under 35 U.S.C. 154(b) by 1122 days.

(21) Appl. No.: 12/123,216

(22) Filed: May 19, 2008

(65) Prior Publication Data

US 2008/0308960 A1 Dec. 18, 2008

Related U.S. Application Data

(60) Provisional application No. 60/930,677, filed on May 18, 2007, provisional application No. 60/998,433, filed on Oct. 11, 2007, provisional application No. 61/010,499, filed on Jan. 10, 2008.

(51) Int. Cl.
 *B29C 43/12* (2006.01)

(52) U.S. Cl.
 USPC ........ 425/405.1; 156/285; 156/286; 425/112; 425/389

(58) Field of Classification Search
 USPC ............... 425/389, 405.1, 111, 112; 264/511; 156/285, 286
 See application file for complete search history.

(56) References Cited

U.S. PATENT DOCUMENTS

| | | | |
|---|---|---|---|
| 2,913,036 A | 11/1959 | Smith | |
| 3,666,600 A | * | 5/1972 | Yoshino ........................ 156/382 |
| 3,856,908 A | 12/1974 | Harper | |
| 4,098,856 A | 7/1978 | Rosenau | |
| 4,125,526 A | 11/1978 | McCready | |
| 4,287,015 A | 9/1981 | Danner, Jr. | |

(Continued)

FOREIGN PATENT DOCUMENTS

| | | |
|---|---|---|
| AU | 2008218935 | 7/2012 |
| CA | 2679111 | 1/2013 |

(Continued)

OTHER PUBLICATIONS

Non-Final Official Action for U.S. Appl. No. 12/036,642 (Oct. 29, 2009).

(Continued)

*Primary Examiner* — Yogendra Gupta
*Assistant Examiner* — Emmanuel S Luk
(74) *Attorney, Agent, or Firm* — Jenkins, Wilson, Taylor & Hunt, P.A.

(57) ABSTRACT

Disclosed are fluid transfer and evacuation structures formed in a vacuum bag operable for use in vacuum-assisted resin transfer molding, debulking, compaction, or similar processes. A reusable vacuum bag can be provided including an elastomeric membrane having a preform-contact surface and at least one textured surface formed in the elastomeric membrane. The textured surface can define a fluid transfer channel. At least one fluid extraction port can be provided in communication with the fluid transfer channel, the fluid extraction port being adapted for engagement to a vacuum pump to remove fluids from the fluid transfer channel. The textured surface defining the fluid transfer channel can be adapted to permit the flow of fluids between the elastomeric membrane and a base mold in communication with the elastomeric membrane when the fluid extraction port is engaged to a vacuum pump.

19 Claims, 9 Drawing Sheets

(56) References Cited

U.S. PATENT DOCUMENTS

| | | | |
|---|---|---|---|
| 4,312,829 A | 1/1982 | Fourcher | |
| 4,622,091 A | 11/1986 | Letterman | |
| 4,681,651 A * | 7/1987 | Brozovic et al. | 156/382 |
| 4,702,376 A | 10/1987 | Pagliaro | |
| 4,822,436 A | 4/1989 | Callis et al. | |
| 4,842,670 A | 6/1989 | Callis et al. | |
| 4,902,215 A | 2/1990 | Seemann, III | |
| 4,942,013 A | 7/1990 | Palmer et al. | |
| 4,985,279 A | 1/1991 | Mussallem, III | |
| 5,129,813 A * | 7/1992 | Shepherd | 425/504 |
| 5,261,993 A * | 11/1993 | Dahlgren | 156/382 |
| 5,316,462 A | 5/1994 | Seemann | |
| 5,318,422 A * | 6/1994 | Erland | 425/388 |
| 5,370,598 A | 12/1994 | Corneau, Jr. | |
| 5,439,635 A | 8/1995 | Seemann | |
| 5,601,852 A | 2/1997 | Seemann | |
| 5,624,512 A | 4/1997 | Boszor | |
| 5,665,301 A | 9/1997 | Alanko | |
| 5,702,663 A | 12/1997 | Seemann | |
| 5,716,488 A | 2/1998 | Bryant | |
| 5,807,593 A | 9/1998 | Thompson | |
| 6,086,813 A | 7/2000 | Gruenwald | |
| 6,406,659 B1 | 6/2002 | Lang et al. | |
| 6,630,095 B2 | 10/2003 | Slaughter et al. | |
| 6,723,273 B2 | 4/2004 | Johnson et al. | |
| 6,811,842 B1 | 11/2004 | Ehrnsperger et al. | |
| 6,816,042 B1 | 11/2004 | Noyes et al. | |
| 6,851,945 B2 | 2/2005 | Potter et al. | |
| 6,869,561 B2 | 3/2005 | Johnson et al. | |
| 7,014,809 B2 | 3/2006 | Audette | |
| 7,029,267 B2 * | 4/2006 | Caron | 425/389 |
| 7,160,498 B2 | 1/2007 | Mataya | |
| 7,413,694 B2 | 8/2008 | Waldrop, III et al. | |
| 7,452,439 B2 * | 11/2008 | Yokoyama | 156/285 |
| 7,662,334 B2 | 2/2010 | Miller et al. | |
| 2003/0019567 A1 * | 1/2003 | Burpo et al. | 156/245 |
| 2005/0086916 A1 | 4/2005 | Caron | |
| 2005/0183818 A1 | 8/2005 | Zenkner et al. | |
| 2005/0184432 A1 | 8/2005 | Mead | |
| 2005/0202156 A1 | 9/2005 | O'Connor et al. | |
| 2005/0261422 A1 | 11/2005 | Ton-That et al. | |
| 2006/0113714 A1 | 6/2006 | Giloh et al. | |
| 2006/0266472 A1 * | 11/2006 | Kipp et al. | 156/286 |
| 2007/0164479 A1 | 7/2007 | Lopez | |
| 2008/0048369 A1 | 2/2008 | Kulesha | |
| 2008/0211130 A1 | 9/2008 | Rydin et al. | |
| 2008/0220112 A1 | 9/2008 | Waldrop et al. | |
| 2013/0056131 A1 * | 3/2013 | Whitworth et al. | 156/64 |

FOREIGN PATENT DOCUMENTS

| | | |
|---|---|---|
| CN | 1 946 541 A | 4/2007 |
| EP | 1 602 470 A1 | 12/2005 |
| FR | 2 710 001 | 3/1995 |
| WO | WO 2005/090057 A1 | 9/2005 |
| WO | WO 2008/103485 A1 | 8/2008 |
| WO | WO 2008/144035 A1 | 11/2008 |

OTHER PUBLICATIONS

"Professional Boatbuilder," http://www.proboat-digital.com/proboat/e20090203/?pg=12, pp. 10-11 (Feb./Mar. 2009).

SR Composites, LLC., www.srcomposites.com (Copyright 2006).

Notification of Transmittal of the International Search Report and the Written Opinion of the International Searching Authority, or the Declaration for International Application No. PCT/US08/06392 (Aug. 8, 2008).

Notification of Transmittal of the International Search Report and the Written Opinion of the International Searching Authority, or the Declaration for International Application No. PCT/US08/02427 (Jun. 11, 2008).

Commonly-assigned, co-pending U.S. Appl. No. 12/036,642 for "Method of Making a Natural Rubber Vacuum Bag by Spray Processes, Natural Rubber Vacuum Bag Made Using Spray Process, and Method for Using Natural Rubber Bag Made Using Spray Process," (Unpublished, filed Feb. 25, 2008).

Interview Summary for U.S. Appl. No. 12/036,642 (Sep. 17, 2010).

Interview Summary for U.S. Appl. No. 12/036,642 (Aug. 31, 2010).

Office Action for Australian Patent Application No. 2008218935(Jul. 20, 2010).

Official Action for U.S. Appl. No. 12/036,642 (May 7, 2010).

Official Action for U.S. Appl. No. 12/036,642 (Oct. 29, 2009).

Lokensgard, "Industrial Plastics Theory and Applications," Thomson Delmar Learning (ed) 4$^{th}$ Edition, pp. 228-229 (2003).

Restriction Requirement for U.S. Appl. No. 12/036,642 (Jun. 18, 2009).

Interview Summary for U.S. Appl. No. 12/036,642 (Apr. 4, 2011).

Final Official Action for U.S. Appl. No. 12/036,642 (Jan. 19, 2011).

Blackley, D.C., "Polymer Lattices: Application of Latices," Springer, 2nd edition, p. 83 (1997).

First Office Action for Chinese Patent Application No. 200880025122.9 (Aug. 23, 2012).

Notice of Allowance for Canadian Patent Application No. 2,679,111 (May 22, 2012).

Notice of Acceptance of Application for Austrailian Patent Application No. 2008218935 (Mar. 20, 2012).

Non-Final Official Action for U.S. Appl. No. 12/036,642 (Mar. 13, 2012).

First Office Action for Chinese Patent Application No. 200880012596.X (Feb. 8, 2012).

Final Office Action for U.S. Appl. No. 12/036,642 (Nov. 7, 2012).

Non-Final Office Action for U.S. Appl. No. 12/036,642 (Mar. 13, 2012).

Official Action for Canadian Patent Application No. 2,679,111 (Aug. 15, 2011).

European Search Report for European Patent Application No. 08726015.4 (Oct. 31, 2013).

\* cited by examiner

VACUUM BAG WITH INTEGRAL FLUID TRANSFER CONDUITS AND SEALS FOR RESIN TRANSFER AND OTHER PROCESSES

RELATED APPLICATIONS

This application claims the benefit of U.S. Provisional Patent Application Ser. Nos. 60/930,677, filed May 18, 2007, 60/998,433, filed Oct. 11, 2007, and 61/010,499, filed Jan. 10, 2008; the disclosures of each of which are incorporated herein by reference in their entireties.

TECHNICAL FIELD

The subject matter described herein relates generally to the field of vacuum bags for use in resin transfer molding and other processes. More particularly, the subject matter described herein relates to fluid transfer and extraction structures formed in a vacuum bag operable for use in vacuum-assisted resin transfer molding, debulking, compaction, or similar processes.

BACKGROUND

Composites are defined broadly as the combination of two or more dissimilar materials to produce a new material that has synergistic properties that were not present in the individual constituents alone. In practical terms, the word composite is generally associated with reinforced plastic material such as fiberglass structures. In the case of fiberglass, beneficial synergistic properties including corrosion resistance, low weight, high strength, and low cost are attainable in a highly variable array of product geometries.

Fabrication of a composite article such as a fiberglass boat hull, bridge deck, or wind blade requires the combination of a solidifiable resin system with a "preform" that could include various reinforcements such as glass fibers, veils, flow media, and cores. There are many processes available for the purpose of impregnating a preform with liquid resin in order to make a composite. One such process is resin transfer molding, which involves a preform being constrained between molding surfaces whereupon resin is introduced into the open spaces remaining. Resin infusion methods advantageously limit exposure to Volatile Organic Compounds (VOC) and Hazardous Airborne Pollutants (HAP), which are recognized by the Environmental Protection Agency (EPA) as potential health hazards for which alternative control technologies should be sought. Further, resin infusion methods allow for better control over part dimensions and fiber volume fraction.

Vacuum Assisted Resin Transfer Molding (VARTM) is a specific approach to resin transfer molding that achieves preform compaction by removing air located between a single sided rigid tool and a flexible vacuum bag that encapsulates a preform placed on the tool. Tooling costs are significantly reduced because there is only one tool surface, and atmospheric pressure replaces the hydraulic press. VARTM provides an affordable closed mold solution for many parts that were previously not considered infusable.

Vacuum bags intended for both vacuum infusion and debulking rely on an ability to remove air and other fluids that reside inside the cavity formed between the mold and the bag. This is typically accomplished by connecting a vacuum pump to one or more vacuum ports located either in the base mold or through the vacuum bag. When the bag is in an initial uncompressed state, it is relatively easy to remove fluids through the discrete vacuum ports. However, as the bag is evacuated, the force of atmospheric pressure above tends to flatten the bag against the base mold and can thus make it progressively more difficult to remove any remaining fluids from between the molding surfaces. Current solutions to this issue generally involve placing pieces of a porous "breather" material in strategic locations throughout the molding surface so as to provide active vacuum channels even when the bag is collapsed on the mold surface. This process requires manual labor to set up, however, and when waste fluids come in contact with the breather material, the material often needs to be replaced.

A further issue regarding the use of vacuum bags is the need to quickly achieve an effective perimeter seal. Common sealing systems include the use of tapes, adhesives, or reusable fasteners. Each of these solutions has problems, though, including the need for additional labor and the creation of material waste. In addition, vacuum bags tend to change shape during a typical life cycle, and therefore the location of fixed seals may move in time making it difficult to maintain bag tension, engage the seals, or both.

In light of these factors, it is apparent that despite a growing interest in the use of reusable vacuum bags, a number of hurdles exist to reusable vacuum bags being fully embraced by the composite industry. Specifically, there exists a need for a vacuum bag that can provide a secure seal to a base mold while still allowing as much vacuum for as long as possible so as to remove air from multiple locations on the dry preform and uniformly infuse the preform without wastefully draining large volumes of resin from the preform.

SUMMARY

The subject matter described herein includes vacuum bags with integral fluid transfer conduits and seals for resin transfer and other processes.

According to one aspect, the subject matter disclosed herein includes a reusable vacuum bag with integral fluid transfer channels for use with a base mold, the reusable vacuum bag including an elastomeric membrane, with the elastomeric membrane having a first surface, at least a portion of the first surface defining a preform-contact surface. The vacuum bag can further include a textured surface on the first surface of the elastomeric membrane, the textured surface defining a fluid transfer channel. In addition, at least one fluid extraction port can be provided in communication with the fluid transfer channel, the fluid extraction port being adapted for engagement to a wet or dry vacuum pump to remove fluids from the fluid transfer channel. The textured surface defining the fluid transfer channel can be adapted to permit the flow of fluids between the first surface of the elastomeric membrane and a base mold surface in communication with the elastomeric membrane when the fluid extraction port is engaged to a vacuum pump.

According to another aspect, the subject matter disclosed herein includes a reusable vacuum bag including an attachment system for securing the reusable vacuum bag to portions of a base mold surface. The reusable vacuum bag can include an elastomeric membrane. The elastomeric membrane can have a first surface, at least a portion of the first surface defining a preform-contact surface. A fluid transfer channel can be positioned on the first surface separate from the preform-contact surface. In addition, the reusable vacuum bag can include at least one fluid extraction port in communication with the fluid transfer channel, the fluid extraction port being adapted for engagement to a wet or dry vacuum pump to remove fluid from beneath the elastomeric membrane in regions where a fluid transfer channel is present. Further, a section of the elastomeric membrane adjacent to the fluid transfer channel can be substantially smooth, and one of the fluid transfer channel or the base mold surface can have a textured surface. The textured surface can be adapted to permit the flow of fluid between the elastomeric membrane and the base mold surface when the fluid extraction port is engaged to a vacuum pump such that the elastomeric membrane is secured to the base mold surface.

According to yet another aspect, the subject matter disclosed herein includes a method of making a membrane for use as a vacuum bag. The method can include providing a working surface for forming a vacuum bag. The working surface can define a preform-contact surface template. One or more articles having a surface texture can be positioned on the working surface. At least one layer of an unsolidified elastomeric material can be applied over at least a portion of working surface. The at least one layer of unsolidified elastomeric material can be solidified to form a membrane having a shape substantially corresponding to that of the working surface, the shape and texture of the one or more articles being incorporated into the membrane as one or more fluid transfer channels and the membrane being elastically deformable and substantially impermeable to fluids for functioning as a vacuum bag. Further, at least one fluid extraction port can be provided in communication with the fluid transfer channels.

BRIEF DESCRIPTION OF THE DRAWINGS

Embodiments of the subject matter described herein will now be explained with reference to the accompanying drawings, of which.

DETAILED DESCRIPTION

Reference will now be made in detail to possible embodiments of the present subject matter, one or more examples of which are shown in the figures. Each example is provided to explain the subject matter and not as a limitation. In fact, features illustrated or described as part of one embodiment can be used in another embodiment to yield still a further embodiment. It is intended that the present subject matter cover such modifications and variations.

Figure 1:
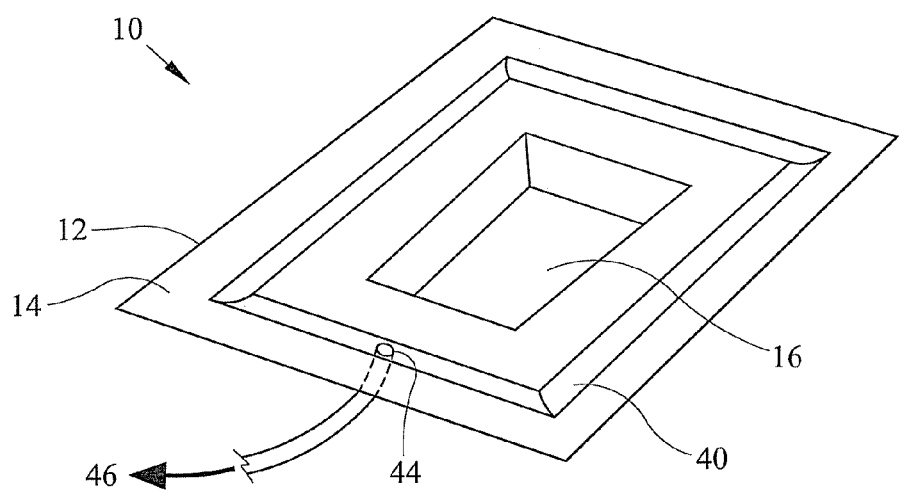
FIG. 1 illustrates an inverted perspective view of vacuum bag according to an embodiment of the present subject matter.
Figure 2:
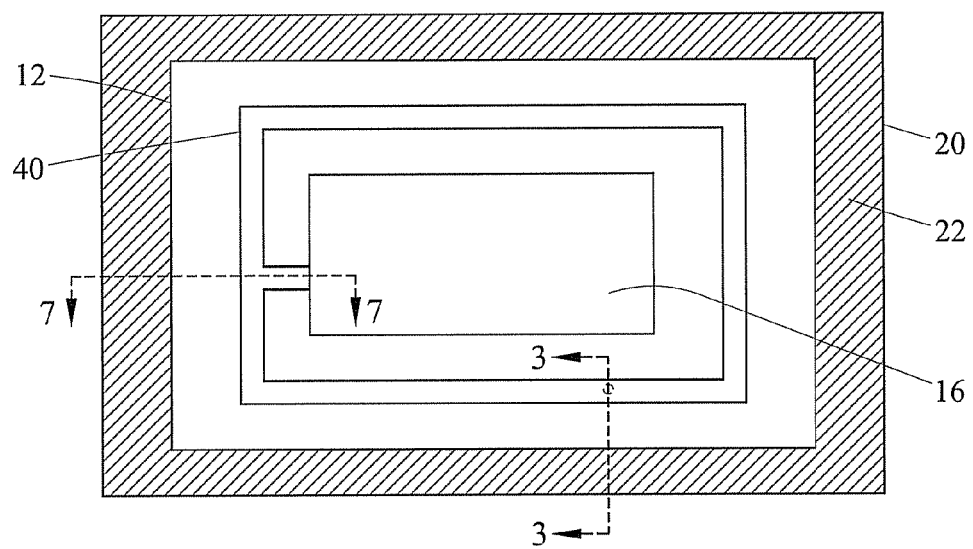
FIG. 2 illustrates a top plan view of a vacuum bag positioned on a base mold.
Figure 3:
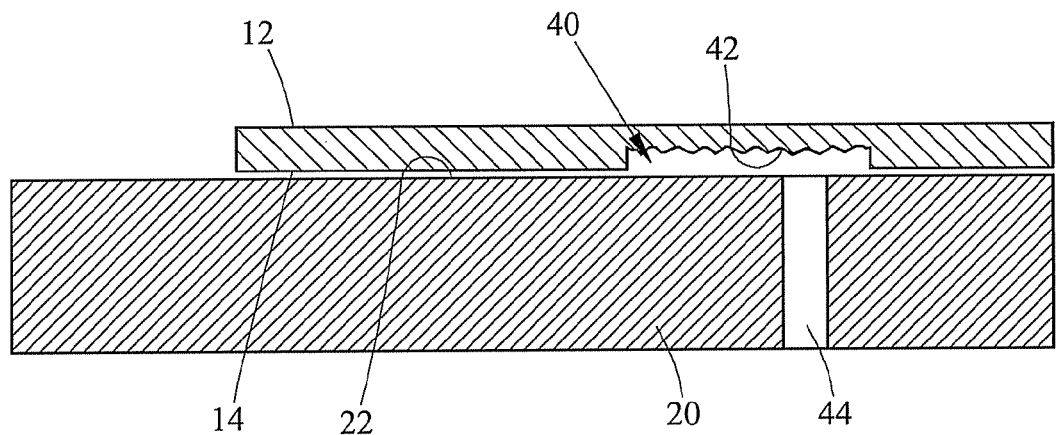
FIG. 3 illustrates a cross-sectional side view of a vacuum bag incorporating a fluid transfer channel according to the embodiment of FIG. 2.

According to one embodiment, as is shown in FIGS. 1 through 3, the present subject matter provides a reusable vacuum bag 10 for use with a base mold 20. Although a reusable vacuum bag 10 can include a frame, caul plates, ports, seals, lift devices, and other components, the primary element is an elastomeric membrane 12. There are several families of materials with an inherent flexibility that would make good candidates for elastomeric membrane 12. These include natural and synthetic rubbers, silicones, urethanes, specialty elastomers, and thermoplastic sheets, to name a few. Exemplary materials suitable for use as elastomeric membrane 12 include those found in commonly-owned, co-pending U.S. patent application Ser. No. 12/036,642, filed Feb. 25, 2008, the disclosure of which is incorporated herein by reference in its entirety. In addition, it can be desirable for the material used to form elastomeric membrane 12 to have the ability to be transformed from a liquid state into a solid state. This phase transformation might involve a polymerization reaction, a melting and crystallization process, an evaporative drying process, or some other method. In this way, the liquid elastomer can be applied to a working surface 30 via spraying, pouring, casting, painting, roll coating, or roto-molding to form elastomeric membrane 12. Regardless of the material or method of construction, elastomeric membrane 12 can be elastically deformable and substantially impermeable to air or other fluid that may be evacuated from the region between elastomeric membrane 12 and base mold 20, making it appropriate for functioning as vacuum bag 10.

Referring to FIGS. 1 through 3, elastomeric membrane 12 can include a first surface 14 that can serve as the mold-side surface of elastomeric membrane 12. A preform-contact surface 16 can be formed in first surface 14 of elastomeric membrane 12. Preform-contact surface 16 generally conforms to the compacted shape of an underlying preform 24 which itself conforms to the base mold surface 22 of an underlying base mold 20 when a pressure is applied to the outer surface of elastomeric membrane 12 (e.g. the surface opposite first surface 14), thereby establishing the desired shape for a composite article created using vacuum bag 10. Advantageously, preform-contact surface 16 can be shaped to substantially mimic the final shape of the composite article to be formed using vacuum bag 10 so that preform-contact surface 16 does not need to stretch unduly to conform to small crevices, detailed geometry, or other surface features. As is depicted in FIG. 2, vacuum bag 10 need not be large enough so as to cover all of base mold surface 22 so long as the entirety of preform 24 is covered and the perimeter of vacuum bag 10 can be sealed to base mold surface 22; however, it should be understood that vacuum bag 10 can be sized to cover all of base mold surface 22 or even extend beyond the outer periphery of base mold 20.

Figure 5:
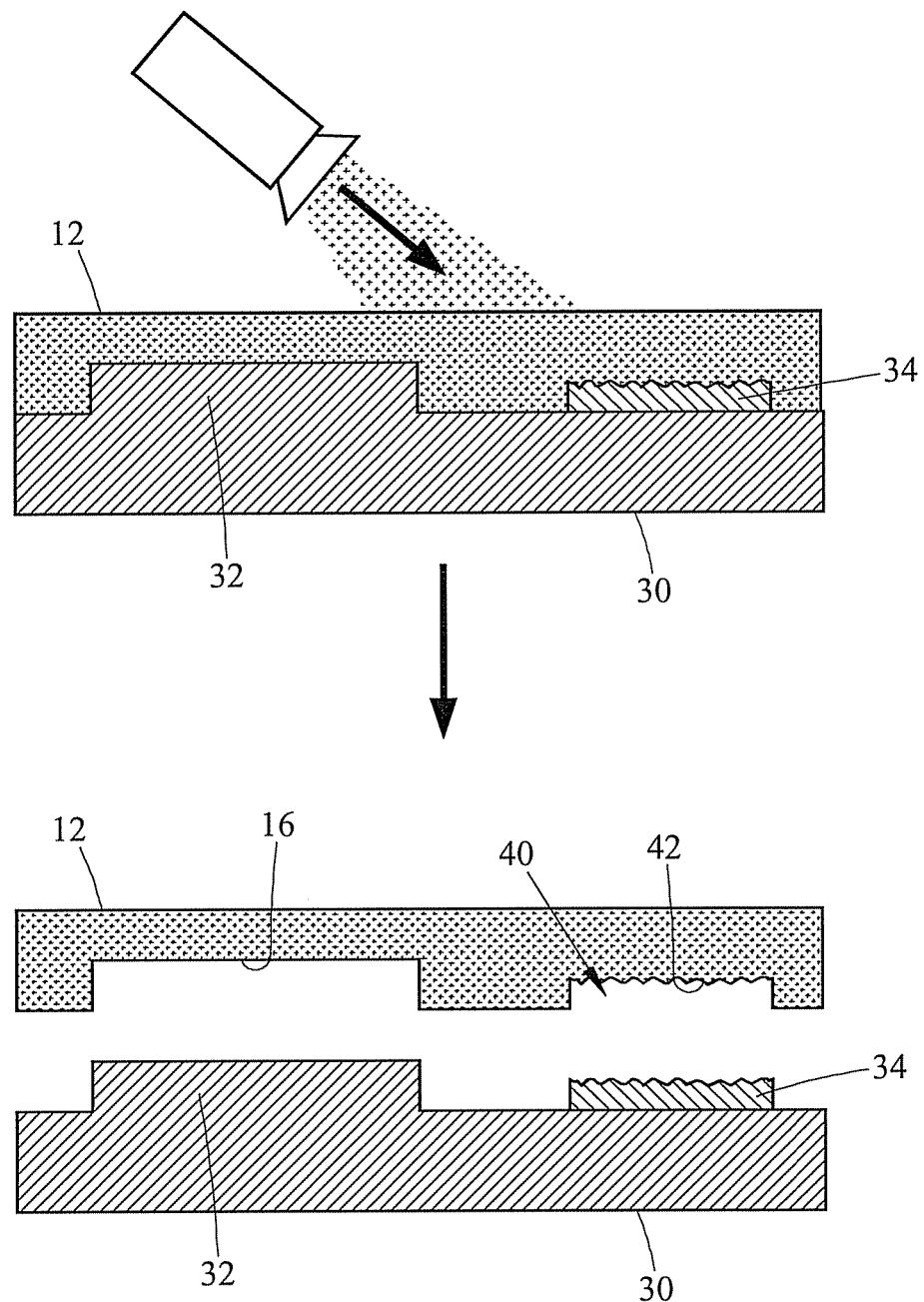
FIG. 5 illustrates a method of fabricating a vacuum bag with an integral fluid transfer channel according to another embodiment of the present subject matter.
Figure 6:
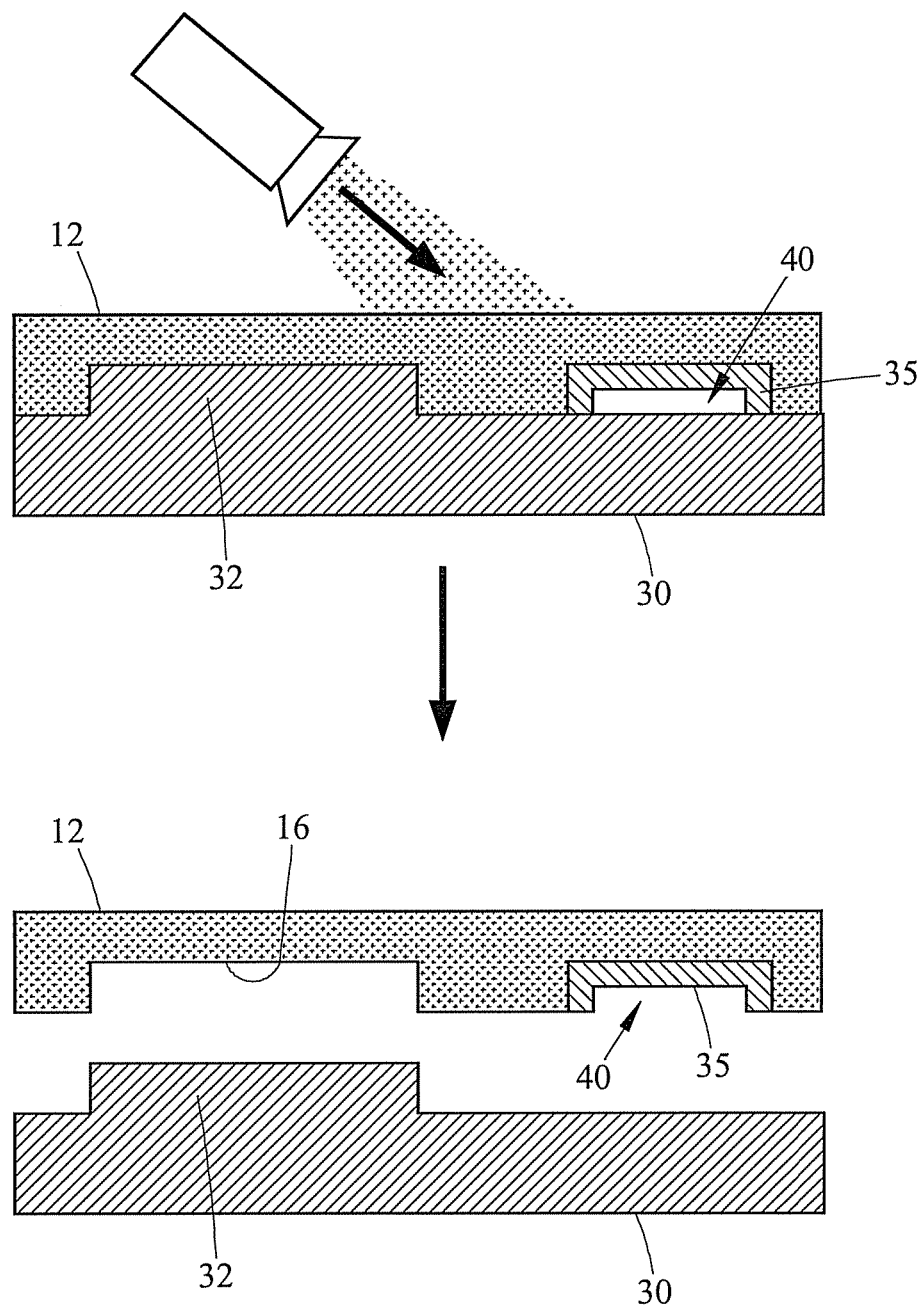
FIG. 6 illustrates another method of fabricating a vacuum bag with an attached fluid transfer channel according to yet another embodiment of the present subject matter.

As is illustrated in FIGS. 5 and 6, at least one layer of the elastomeric material can be applied over at least a portion of working surface 30 to form elastomeric membrane 12. Preform-contact surface 16 can be formed by providing a substantially non-porous working surface 30 for forming vacuum bag 10, with working surface 30 defining a preform-contact surface template 32. The elastomeric material can be solidified (e.g., cured) to form elastomeric membrane 12 defining preform-contact surface 16 having a shape substantially corresponding to that of the preform-contact surface template 32 of working surface 30. Alternatively, a substantially unaltered portion of elastomeric membrane 12 can serve as preform-contact surface 16. The portion of elastomeric membrane 12 need not define a particular shape but instead can be stretched over preform 24. In this alternative, the shape of the composite article is defined by preform-contact surface 16 conforming to preform 24 under the application of a force (e.g., vacuum pulling elastomeric membrane 12 and preform 24 against underlying base mold surface 22).

In addition to preform-contact surface 16, FIG. 5 shows that at least one fluid transfer channel 40 can also be formed in elastomeric membrane 12. For instance, fluid transfer channel 40 can be a textured surface 42 formed on the elastomeric membrane 12. Textured surface 42 ensures that fluid transfer channel 40 remains permeable to fluids while still providing sufficient resistance to applied forces pressing vacuum bag 10 against base mold 20 such that fluid transfer channel 40 does not collapse. During the creation of vacuum bag 10, one or more articles 34 can be positioned on working surface 30 to serve as a template upon which to create fluid transfer channel 40 in elastomeric membrane 12. The material from which articles 34 are created can be selected so that the elastomeric material used to form elastomeric membrane 12 does not adhere to articles 34. In this way, completed elastomeric membrane 12 can be cleanly removed from articles 34 and preform contact surface 32, but the shape and texture or articles 34 is transferred to fluid transfer channel 40.

Alternatively, a textured surface can be formed on base mold surface 22 rather than on elastomeric membrane 12 to create a fluid transfer channel 40, although a textured mold surface can be more difficult to clean than a textured membrane should it become filled with waste fluid. In still another alternative construction shown in FIG. 6, a separate channel-forming article 35 can be secured to first surface 14 of vacuum bag 10 after elastomeric membrane 12 has been constructed, with channel-forming article 35 containing fluid transfer channel 40. For instance, a strip of material that is curved about a longitudinal axis (e.g., a tube cut in a lengthwise direction) can be secured to first surface of elastomeric membrane 12 to define fluid transfer channel 40. This channel-forming article 35 can be attached to elastomeric membrane 12 as part of the fabrication of vacuum bag 10. In this regard, article 35 can be placed on the working surface 30 on which vacuum bag 10 will be constructed. At least one layer of an elastomeric material can be applied over working surface 30 and channel-forming article 35, thereby incorporating channel-forming article 35 into elastomeric membrane 12 as the elastomeric material solidifies. Alternatively, a separately-created elastomeric membrane 12 can be otherwise secured to channel-forming article 35 (e.g., adhesively attached, mechanically coupled). In any of these configurations, a conduit having a finite permeability is created between elastomeric membrane and base mold surface 22.

Figure 7:
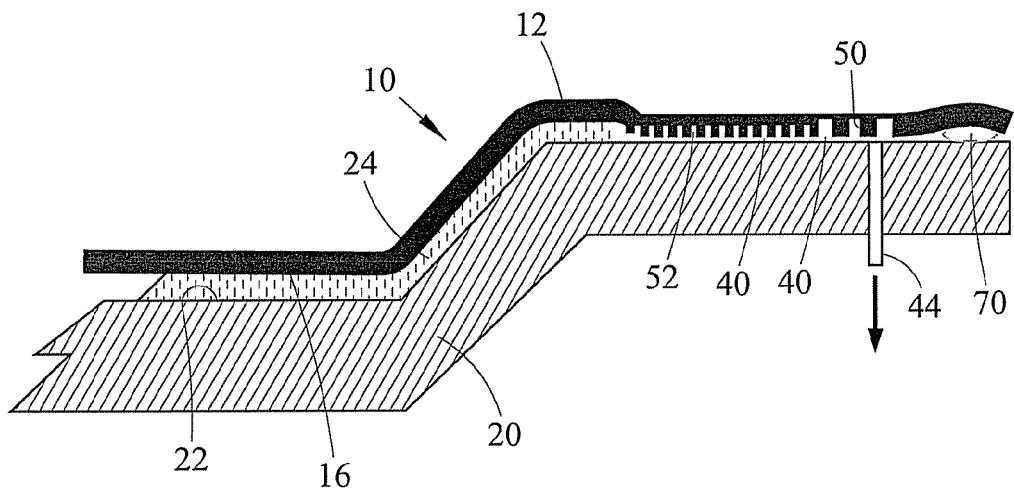
FIG. 7 illustrates a cross-sectional side view of the vacuum bag compacting a preform against a base mold according to the embodiment of FIG. 2.
Figure 8:
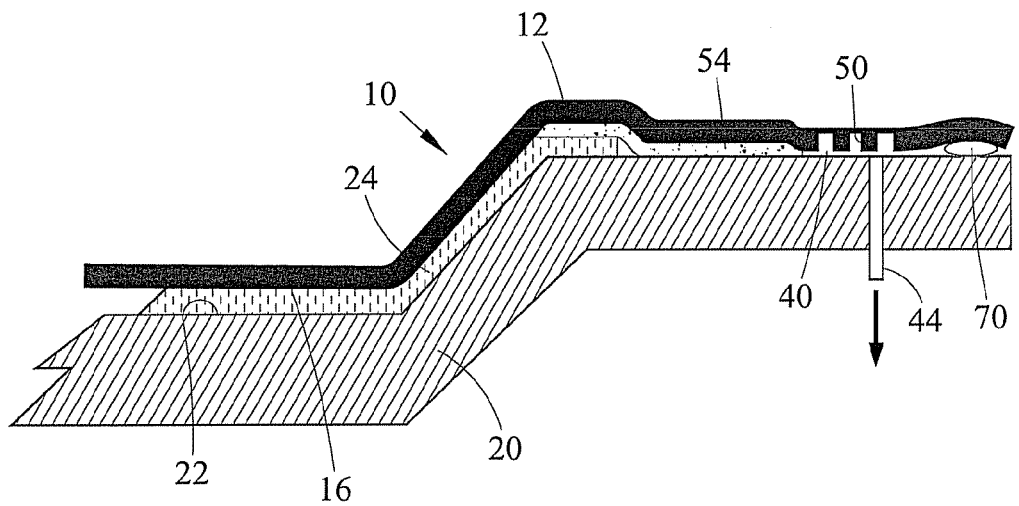
FIG. 8 illustrates another embodiment of a vacuum bag compacting a preform against a base mold and using a disposable breather between the preform and the fluid transfer channel.

In addition, referring to FIGS. 7 and 8, at least one fluid extraction port 44 can be provided in communication with fluid transfer channel 40, fluid extraction port 44 being adapted for engagement to a vacuum pump 46 to remove fluid from within fluid transfer channel 40. In this arrangement, textured surface 42 of fluid transfer channel 40 is adapted to permit the flow of gases such as air and/or liquids between elastomeric membrane 12 and base mold surface 22 in communication with elastomeric membrane 12 when fluid extraction port 44 is engaged to a vacuum pump 46. Further, fluid extraction port 44 can be used to draw waste fluids from fluid transfer channel 40. Waste fluids that are not wanted or needed in preform 24 or fluid transfer channel 40 can include air, water, volatile gases, excess resin, and other fluids that are present in excess quantities between vacuum bag 10 and base mold surface 22. Fluid extraction port 44 can be attached to vacuum bag 10 in communication with fluid transfer channel 40, as is illustrated in FIGS. 1, 12, 13, and 15. Alternatively, fluid extraction port 44 can be formed in base mold 20 and positioned such that when vacuum bag 10 is positioned on base mold surface 22, fluid extraction port 44 is in communication with fluid transfer channel 40, Examples of this configuration are shown in FIGS. 3, 7, 8, and 14. Similarly, a resin source (not shown) can be connected through base mold 20 or vacuum bag 10 such that it is in communication with preform 24 to supply resin to preform 24 during a resin transfer molding process.

Figure 4:
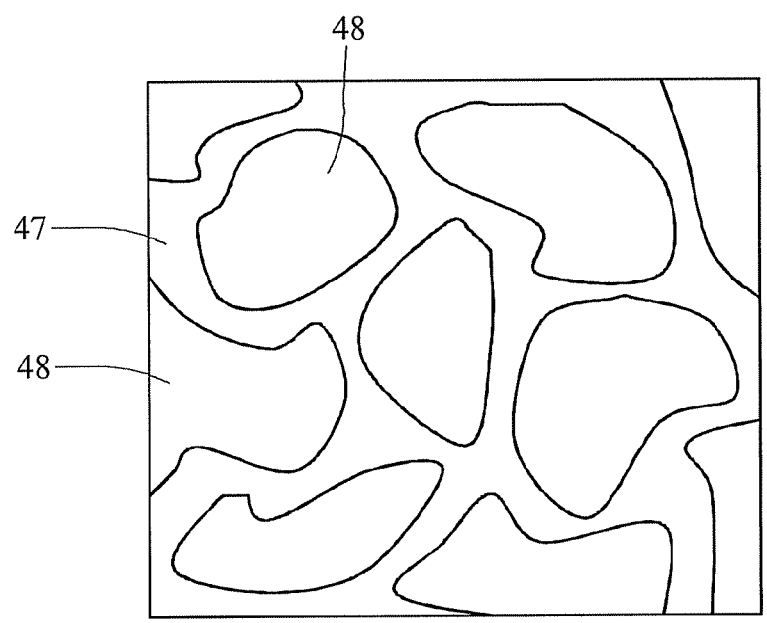
FIG. 4 illustrates a representative texture profile for a fluid transfer channel according to an embodiment of the present subject matter.

There are various methods of creating textured surface 42 that can define the fluid transfer channel 40. For instance, textured surface 42 can be achieved by selecting articles 34 to be positioned on working surface based on their surface texture. By way of example, a fluid transfer channel 40 having a textured surface 42 can be created by positioning a strip of textured material around preform-contact surface template 32 on working surface 30. Specifically, the strip of textured material can be a strip of sand paper having a desired grit, or the strip of textured material can be custom designed by covering an adhesive strip with crushed aggregate or the like. In this way, when the elastomeric material is applied to working surface 30 to create elastomeric membrane 12, the shape and texture of one or more articles 34 is incorporated into elastomeric membrane 12 as one or more fluid transfer channels 40. The mirror image of a particular texture material is transferred to elastomeric membrane 12 formed thereon. As an example, if a texture defined by a contiguous network of open passages 47 among raised pillars 48 is desired in fluid transfer channel 40, an example of which is depicted in FIG. 4, the texture on a surface of articles 34 can include a discontinuous network of open spaces or valleys surrounded by a contiguous network of hills.

As noted above, textured surface 42 defining fluid transfer channel 40 can serve as a conduit for the transfer or removal of fluids from beneath elastomeric membrane 12. Specifically, as is depicted in FIGS. 7 and 8, when vacuum bag 10 is sealed against base mold 20, fluid transfer channel 40 can be used to draw air from within preform 24 as preform 24 is compacted and/or infused with a resin between base mold 20 and preform-contact surface 16 of elastomeric membrane 12. In this regard, it is not necessary for fluid transfer channel 40 to be a substantially deep channel to serve its intended purpose. In fact, it can be desirable for fluid transfer channel 40 to be relatively shallow so that the kinds of materials that can be passed through fluid transfer channel 40 can be limited. Stated otherwise, fluid transfer channel 40 can be designed to be sufficiently permeable to allow the passage of air but not so permeable that other fluids, such as infusion resins, can readily pass.

The ability of a fluid to pass through fluid transfer channel 40 (i.e., the permeability of the fluid transfer channel 40) can be controlled by controlling the profile of surface texture 42 formed thereon. Specifically, a texture profile that has pronounced surface variations (e.g., rough surface) can be used to create a high-permeability fluid transfer channel 40, whereas a texture profile that is less pronounced (e.g., nearly smooth surface) can create a low-permeability fluid transfer channel 40. The permeability of fluid transfer channel 40 can also be a function of the thickness of vacuum bag 10 to the extent that it can resist atmospheric pressure pushing it into intimate contact with base mold 20 and preform 24, thereby closing down the open spaces that make up the fluid transfer channels 40. In addition, a reinforcing mesh or rigid article can be encapsulated in elastomeric membrane 12, or the thickness of vacuum bag 10 can be adjusted in these areas to provide additional resistance to deformation.

Figure 9:
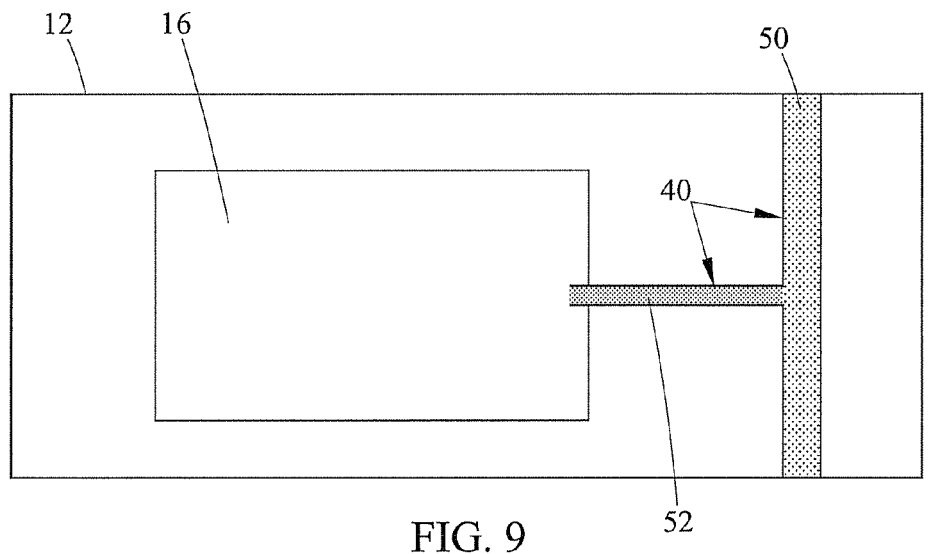
FIG. 9 illustrates a bottom plan view of a vacuum bag according to an embodiment of the present subject matter having a fluid transfer channel with a permeability gradient.
Figure 10:
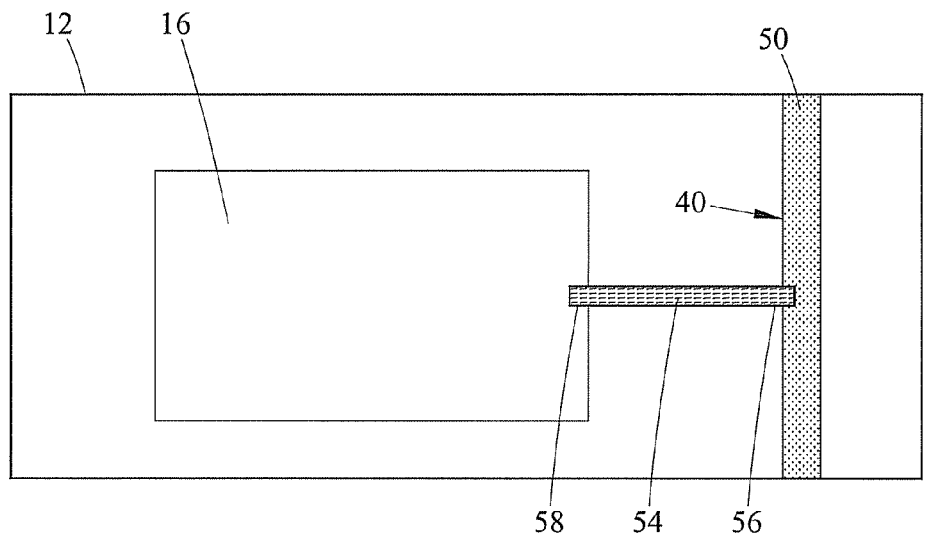
FIG. 10 illustrates a bottom plan view of a vacuum bag according to another embodiment of the present subject matter including a disposable breather strip.
Figure 11:
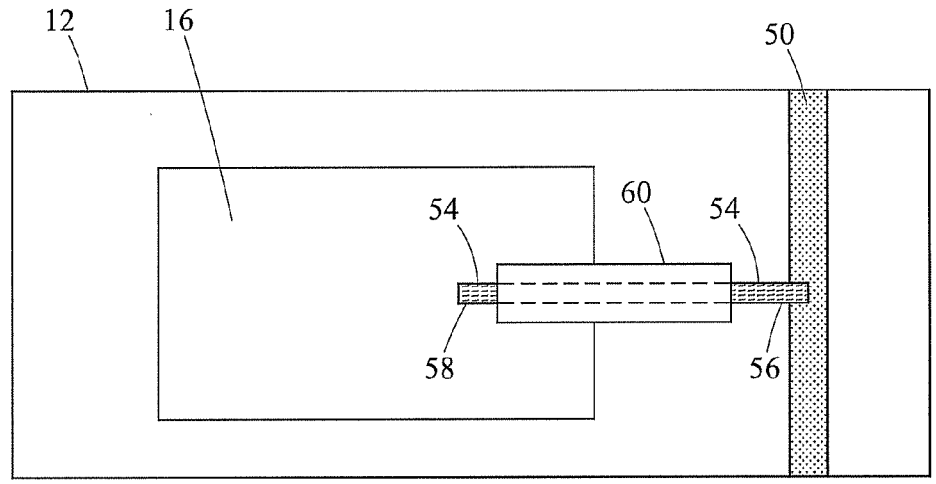
FIG. 11 illustrates a bottom plan view of a vacuum bag according to yet another embodiment of the present subject matter including a disposable breather strip.

Fluid transfer channel 40 can further be designed such that the permeability is different at different locations along its length. For instance, referring to FIGS. 7 and 9, fluid transfer channel 40 can include a bleeder section having a relatively high permeability first texture profile 50 positioned outside preform-contact surface 16 of elastomeric membrane 12. The bleeder section can be connected to a fluid extraction port 44. In addition, fluid transfer channel 40 can include a breather section having a relatively low permeability second texture profile 52 positioned between the bleeder section and specific portions of preform-contact surface 16. In the case of vacuum assisted resin transfer molding, the breather section can be positioned to overlap preform 24 in specific locations where it is desired to remove waste fluids such as air but not drain excessive amounts of resin from the infused preform. Alternatively, as is depicted in FIGS. 10 and 11, the function of the breather section can be performed by one or more disposable breather material strips 54 placed in contact with preform 24 and overlapping the bleeder section of fluid transfer channel 40.

In either arrangement, the variable permeability of the bleeder and breather elements is intended to maintain vacuum communication between fluid extraction port 44 and preform 24 without simultaneously providing a resin drain. In other words, air can be drawn through the relatively lower permeability second texture profile 52 of the breather element, but the flow of resin is intentionally slowed, thus providing broad vacuum coverage without drawing large volumes of resin out of preform 24. If any resin does manage to pass through the breather section, however, the higher permeability first texture profile 50 of the bleeder section ensures that the resin can be cleared out of the way so as to prevent a blockage in fluid transfer channel 40. Further, at least portions of the breather section can be designed to extend the distance traveled and hence prolong the time required for a liquid such as resin to reach the bleeder 50 portion of fluid channel 40. For instance, second texture profile 52 of the breather section can be designed to have a circuitous, maze-like flow path to increase the effective length of the fluid transfer channel. Therefore, by connecting such low permeability breather elements with a high permeability bleeder manifold it is possible to project a vacuum capacity around preform 24 without presenting a debilitating resin drain.

Further, because vacuum bag 10 is reusable and fluid transfer channel 40 can be formed as varied surface textures 42, there is little to no disposable breather or bleeder material waste. As a result, the disclosed method and apparatus provides a "green" fabrication process that can provide economic advantages for closed molding of composite articles.

As noted above, one specific application of such a fluid transfer channel 40 is to draw air out from between preform-contact surface 16 and base mold surface 22 (e.g., to compact preform 24). For this use, referring again to FIGS. 7 and 8, a reusable vacuum bag 10 can be positioned over preform 24 and sealed at the perimeter of base mold 20. When air is removed from the space between vacuum bag 10 and base mold 20, a differential pressure is created across membrane 12 which forces vacuum bag 10 into intimate contact with the underlying preform 24 and or mold surface 22. Whereas many surfaces of elastomeric membrane 12 are thus brought into intimate contact with either base mold 20 or preform 24, textured surface 42 defining fluid transfer channel 40 supports fluid transfer channel 40 against this pressure. In this way, fluid transfer channel 40 can be positioned around preform-contact surface 16 to provide multiple exit paths for entrapped air or whatever other fluid might be present in fluid transfer channel 40 or preform 24. In particular, one or more fluid transfer channels 40 can be positioned strategically about preform-contact surface 16 to help prevent "islanding" and ensure that air is not left trapped at isolated locations in preform 24 which can result in regions of a composite article not having sufficient resin present to completely bind the preform together. Fluid transfer channel 40 can be positioned so as not to overlap preform-contact surface 16 except at selected points around the periphery of preform contact surface 16. Therefore, as opposed to structures intended to aid the movement of resin into a preform 24, fluid transfer channel 40 can be specifically located to help draw waste fluids from preform 24.

In this application as a vacuum conduit, the profile of textured surface 42 can vary along the length of fluid transfer channel 40. For instance, as is depicted in FIGS. 7 and 9, fluid transfer channel 40 can be made up of at least two different sections having different fluid permeabilities. First, the bleeder section can be formed in communication with the at least one fluid extraction port 44. The bleeder section can have a relatively high permeability first texture profile 50 such that when fluid is extracted and elastomeric membrane 12 tends to compress against base mold 20, first texture profile 50 supports fluid transfer channel 40 so that it remains open enough to permit the flow of air, liquid, or any other fluid to be transported between elastomeric membrane 12 and base mold surface 22.

Second, at least one breather section can be formed in communication with preform-contact surface 16. The breather section can have a second texture profile 52 having a low permeability relative to that of first texture profile 50 of the bleeder section, wherein second texture profile 52 permits the flow of gases between elastomeric membrane 12 and base mold 20, but the flow of liquids is substantially diminished. Stated otherwise, fluid transfer channel 40 can be designed such that a permeability gradient exists along different portions of fluid transfer channel 40.

This arrangement can be used advantageously, for example, for vacuum-assisted resin transfer molding. Resin can be supplied to preform 24 held between preform-contact surface 16 of vacuum bag 10 and base mold surface 22, and air can be pulled from within preform 24 by means of fluid transfer channel 40. The specific design of second texture profile 52 allows gases to be removed from preform 24, but substantially restricts the removal of the liquids. In this way, resin provided to preform 24 is maintained within the confines of preform-contact surface 16 to be infused into preform 24 and not siphoned off and wasted. Plus, if any resin does somehow pass through the breather section, the higher permeability of first texture profile 50 is intended to clear any fluids so as to minimize any blockage in fluid transfer channel 40.

In addition, referring to FIGS. 8 and 10, it is noted that discrete pieces of breather material 54 can be used in place of or in addition to the integral breather section formed in elastomeric membrane 12. Although such breather materials 54 are generally disposable and result in waste, the use of such materials can be advantageous in certain situations. For instance, a piece of permeable breather material 54 can be positioned between the bleeder section of fluid transfer channel 40 and preform 24 contained between preform-contact surface 16 and base mold surface 22. The permeable breather material 54 can have a first end 56 and a second end 58, first end 56 being positioned in communication with fluid transfer channel 40, and second end 58 being positioned in communication with preform 24.

In addition, referring again to FIG. 11, a piece of impermeable material 60 can be coupled to the piece of permeable material 54 between first end 56 and second end 58. For example, impermeable material 60 can be wrapped around permeable breather material 54 between first and second ends 56 and 58, but leaving first and second 56 and 58 ends exposed. In this way, only air entering second end 58 can pass through permeable breather material 54 to fluid transfer channel 40. Similarly, a piece of impermeable material 60 can be coupled to first surface 14 of elastomeric membrane 12 over at least a portion of an integral breather section in fluid transfer channel 40. In either of these arrangements, air can be drawn from locations on preform 24 that are not immediately adjacent to the edge of preform-contact surface 16, effectively creating a fluid transfer bridge from that location. The use of such breather materials 54 can therefore further help to eliminate "islanding" and thus reduce the occurrence of dry spots in a composite article formed by the resin infusion of preform 24.

Figure 12:
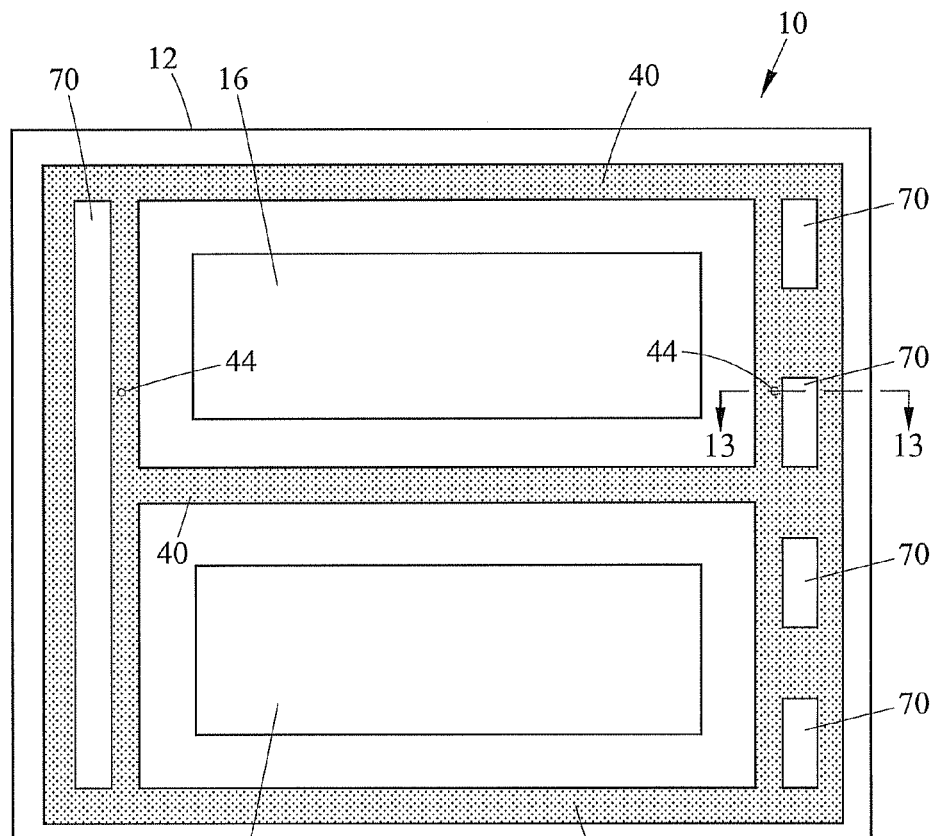
FIG. 12 illustrates a bottom plan view of a vacuum bag having a fluid transfer channel serving as an attachment mechanism according to still another embodiment of the present subject matter.

In another aspect illustrated in FIG. 12, fluid transfer channels 40 can be incorporated into vacuum bag 10, but not in communication with preform-contact surface 16. This kind of fluid transfer channel 40 can serve as an attachment mechanism between vacuum bag 10 and base mold 20. In this embodiment, reusable vacuum bag 10 can again include an elastomeric membrane 12, with elastomeric membrane 12 defining a preform-contact surface 16. In contrast to the previous embodiment, however, fluid transfer channels 40 can be formed in elastomeric membrane 12 separate from the air evacuation system used to compact preform 24. In this regard, fluid transfer channel 40 can be connected to a separate, dedicated fluid extraction port 44 adapted for engagement to a vacuum pump 46 to remove fluid from within fluid transfer channel 40. In most cases the fluid will be air, and the air will be removed via a vacuum pump 46. It is conceivable other fluids would be present in certain situations and that their removal from fluid transfer channel 40 via fluid extraction port 44 would require some form of pumping action as well.

Either of fluid transfer channel 40 or base mold surface 22 can include a textured surface 42 adapted to permit the flow of air between elastomeric membrane 12 and base mold surface 22 when fluid extraction port 44 is engaged to vacuum pump 46. Fluid transfer channels 40 in this embodiment can be provided as discrete point attachment sites or longer continuous strips for more substantial attachment. In other arrangements, fluid transfer channels 40 can be provided about the entirety of preform-contact surface 16 of elastomeric membrane 12 to form a seal around preform-contact surface 16. This sealing arrangement can be provided around a single preform-contact surface 16, or fluid transfer channels 40 can bisect multiple preform-contact surfaces 16 formed in the same vacuum bag 10. When used in this way as a mold partition between multiple preform-contact surfaces 16, fluid transfer channel 40 can be used to isolate distinct preform-contact surfaces 16 or zones of a mold. By creating a fluid-tight border between distinct preform-contact surfaces 16 or zones of a mold it is possible to maintain different pressures within the various zones and cavities all under a single vacuum bag 10. This could be useful when different size or shape parts are being infused under a single bag and the infusion times are different for each part.

Advantageously, although fluid transfer channel 40 can be defined by textured surface 42, at least a portion of elastomeric membrane 12 adjacent to the fluid transfer channel 40 can be substantially smooth. This substantially smooth surface can be positioned adjacent to a substantially smooth surface of base mold 20 and fluid can be withdrawn from fluid transfer channel 40. The net result of removing fluid from fluid transfer channel 40 is to lower the pressure in fluid transfer channel 40 relative to the pressure acting outside fluid transfer channel 40. In the case of elastomeric membrane 12 and base mold 20 being surrounded by atmospheric pressure, removal of fluid from fluid transfer channel 40 creates differential pressures and results in the two surfaces being forced together in the immediate environs of fluid transfer channel 40. This resultant force can be useful because it can provide the mechanism to pin elastomeric membrane 12 and base mold 20 together either at discrete points, along lines, or in any geometric shape formed by fluid transfer channel 40. As a result, this structure serves as a releasable attachment mechanism.

Although in most applications, the sections of both elastomeric membrane 12 and base mold 20 that will be attached using fluid transfer channel 40 will be substantially flat, the use of fluid transfer channel 40 as an attachment mechanism can be more broadly applied. The attachment system described herein is equally capable of being applied to surfaces that are non planar, and in fact, this attachment system has unique advantages for topographically variable surfaces. In addition, elastomeric membranes used as reusable vacuum bags may stretch over their useful life due to thermal cycling, diffusion of foreign particles, and applied stresses. It is therefore helpful to be able to adjust the tension in flexible vacuum bag 10 relative to the underlying base mold 20. The use of fluid transfer channel 40 as a reusable perimeter attachment mechanism described herein provides a simple means of adjusting the tension in vacuum bag 10 because the connection mechanism is not tied to a single location. Fluid transfer conduit 40 can be positioned wherever vacuum bag 10 is to be secured to base mold 20. As a result, vacuum bag 10 can continue to be used even when elastomeric membrane 12 no longer exhibits its original shape.

An external force can be used to bring elastomeric membrane 12 into intimate contact with the surface of base mold surface 22 prior to reducing the pressure in the closed cavity. For example, soft weighted bags, rigid and semi-rigid perimeter frames, and/or the weight of membrane 12 itself can assist in bringing base mold 20 and vacuum bag 10 into intimate contact such that the open cavity becomes sufficiently closed for the pressure within to be reduced.

Figure 13:
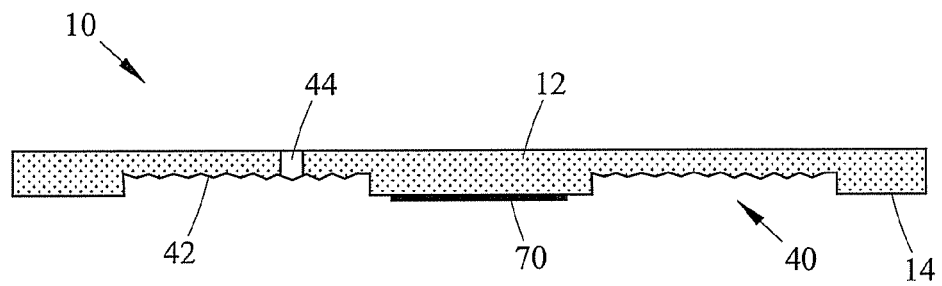
FIG. 13 illustrates a cross-sectional side view of the vacuum bag having an attachment structure according to the embodiment depicted in FIG. 12.
Figure 14:
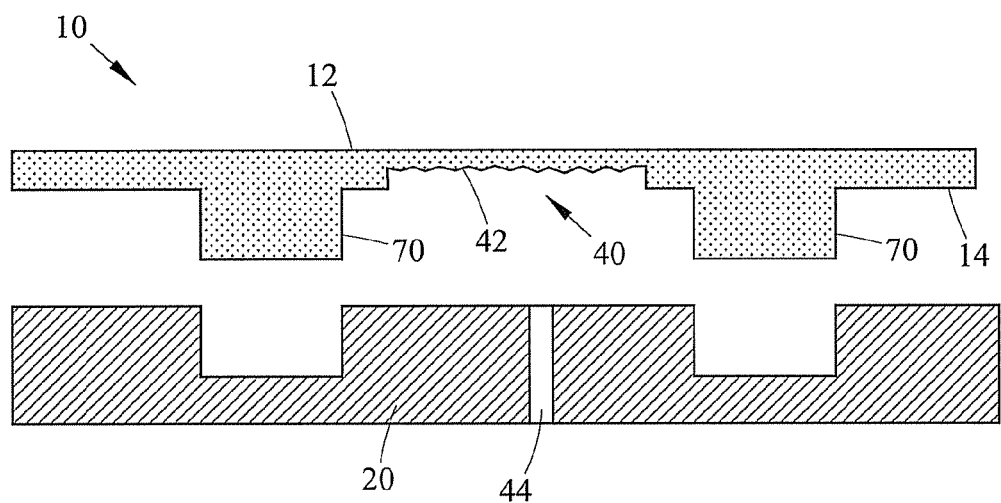
FIG. 14 illustrates another side view of a vacuum bag having an attachment structure according to an embodiment of the present subject matter.

In addition, referring to FIGS. 12 through 14, at least one fastener 70 can also be secured to elastomeric membrane 12 for fastening elastomeric membrane 12 to a base mold 20, creating a connection between the components until the vacuum is applied. Fastener 70 can include a key and groove arrangement (see, e.g., FIG. 14), wherein at least one groove is cut in base mold 20, and a correspondingly-shaped protruding element is formed in vacuum bag 10. In this configuration, two protruding locking elements fit into two grooves in base mold 20 to interlock vacuum bag 10 and base mold 20. Other forms for fastener 70 can include a zipper seal, cleats, clamps, hook-and-loop type fasteners (e.g., "Velcro"; see FIG. 13), or any other fastener capable of providing a releasable connection between vacuum bag 10 and base mold 20. Fasteners 70 can be secured to elastomeric membrane 12 and or base mold 20 in any way known in the art, including adhesively coupling fasteners 70 to elastomeric membrane 12 and base mold surface 22 or securing one element of fasteners 70 to elastomeric membrane 12 during the molding process as the elastomeric material solidifies. As is shown in FIG. 12, fasteners 70 can attach vacuum bag 10 to base mold 20 at discrete points or along continuous portions of elastomeric membrane 12. Either way, fasteners 70 can be used to temporarily secure elastomeric membrane 12 and base mold 20 in sufficiently intimate contact such that fluid can be removed from fluid transfer channel 40 via fluid extraction port 44 without new fluid entering into fluid transfer channel 40 to replace the removed fluid.

Figure 15:
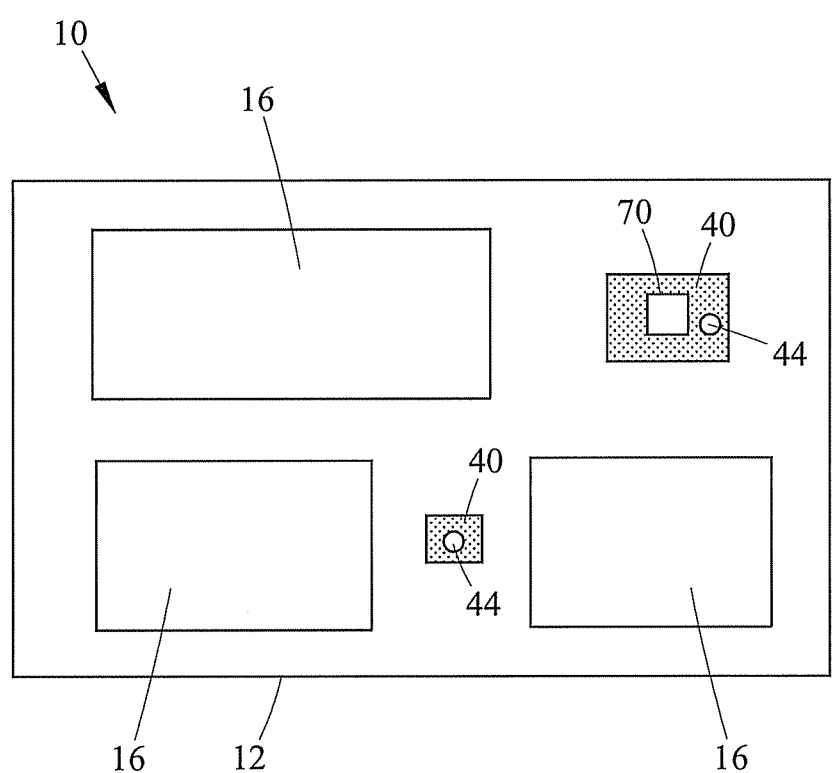
FIG. 15 illustrates a bottom plan view of a vacuum bag having a fluid transfer channel serving as an attachment mechanism and bag locating guide according to yet another embodiment of the present subject matter.

Further, the use of fluid transfer channel 40 and fasteners 70 in this manner can be useful as a position locator. As molds become larger and or more complex, it becomes helpful to have fixed reference points for placing vacuum bag 10 on base mold 20 in the correct orientation. Also, it can be a challenge to load larger vacuum bags on a mold without shifting the preform. As is shown in FIG. 15, fluid transfer channel 40 and fasteners 70 can thus be used as vacuum bag position locators to enable vacuum bag 10 to be rolled out on base mold 20 in proper alignment, minimizing shearing of the underlying preform 24 due to excessive bag rearrangement.

Referring to one example of a fastener used for any one of these functions shown in FIG. 13, the at least one fastener 70 can be a hook-and-loop type fabric patch having a surface area equal to or less than the surface area of fluid transfer channel 40 can be positioned near or more preferably within fluid transfer channel 40. The hook-and-loop fastener 70 can have either the hook or the loop portion attachable to elastomeric membrane 12 and the opposite meshing portion (not shown in FIG. 12) attachable to base mold 20, and fluid extraction port 44 connected through either elastomeric membrane 12 or base mold 20. Either arrangement provides a path of fluid communication with fluid transfer channel 40.

There are several different ways to attach the hook-and-loop fastener 70 to elastomeric membrane 12 and base mold 20. In one configuration, a recessed groove can be formed in elastomeric membrane 12, wherein either the hook or loop portion of hook-and-loop fastener 70 can be attached. The other portion of hook-and-loop fastener 70 can be attached to base mold 20. In other particular embodiments, a recessed groove can be formed in the base mold 20, or a low-profile hook-and-loop fastener 70 can be used. In any of these alternatives, the result can be that when the two surfaces are brought together and the hook-and-loop fastener sections are engaged, there is no major out-of-plane protuberance that prevents the two surfaces from being brought into sufficiently intimate contact. As a result, the fluid can be removed by means of fluid transfer channel 40 via fluid extraction port 44.

As noted above, elastomeric membranes used as reusable vacuum bags may stretch over their useful life. When used in conjunction with fluid transfer channel 40 attachment structure, hook-and-loop fasteners 70 are thought to be useful because such fasteners do not require precise placement. That is, unlike zippers, clasps, or slot and keyway arrangements, the hook portion and loop portion need not be precisely aligned to provide secure attachment. For example, a small upper portion of the hook-and-loop fastener connected to vacuum bag 10 can correspondingly engage a much larger strip of hook-and-loop fastener attached to base mold 20 in such a way that vacuum bag 10 can be stretched and secured to base mold 20 in numerous locations, thus allowing for the taking up of any slack that may form in vacuum bag 10. The use of hook-and-loop fasteners 70 thus helps make the reusable perimeter attachment structure described herein a simple means of adjusting the tension in vacuum bag 10.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A reusable vacuum bag with integral fluid transfer channels for use with a base mold, the reusable vacuum bag comprising:
   a substantially impermeable elastomeric membrane, the elastomeric membrane having a first surface configured for positioning against a base mold and a preform positioned on the base mold, at least a portion of the first surface defining a preform-contact surface;
   a textured surface integrally formed on the first surface of the elastomeric membrane, the textured surface defining a fluid transfer channel; and
   at least one fluid extraction port in communication with the fluid transfer channel, the fluid extraction port being adapted for engagement to a vacuum pump to remove fluids from the fluid transfer channel;
   wherein the textured surface defining the fluid transfer channel is adapted to permit the flow of fluids between the first surface of the elastomeric membrane and a base mold surface in communication with the elastomeric membrane when the fluid extraction port is engaged to a vacuum pump.

2. The reusable vacuum bag of claim 1, wherein the elastomeric membrane comprises a natural rubber membrane.

3. The reusable vacuum bag of claim 1, wherein the elastomeric membrane comprises a silicone membrane.

4. The reusable vacuum bag of claim 1, wherein the fluid transfer channel is positioned on the first surface outside the preform-contact surface.

5. The reusable vacuum bag of claim 1, wherein at least a portion of the fluid transfer channel is positioned on the first surface in communication with the preform-contact surface.

6. The reusable vacuum bag of claim 1, wherein the textured surface comprises a texture profile that varies along the fluid transfer channel such that the fluid transfer channel has a permeability gradient.

7. The reusable vacuum bag of claim 4, wherein the textured surface defining the fluid transfer channel comprises a bleeder section in communication with the at least one fluid extraction port, the bleeder section having a relatively high permeability first texture profile, wherein the first texture profile is adapted to permit the flow of gases and liquids between the first surface of the elastomeric membrane and the base mold surface.

8. The reusable vacuum bag of claim 7, wherein the textured surface defining the fluid transfer channel comprises at least one breather section in communication with the preform-contact surface, the breather section defining a second texture profile that has a relatively lower permeability than the bleeder section, wherein the breather section is adapted to permit the flow of gases and substantially slow the flow of liquids between the preform-contact surface and the bleeder section.

9. The reusable vacuum bag of claim 8, comprising a piece of impermeable material coupled to the first surface of the elastomeric membrane over a portion of the breather section.

10. The reusable vacuum bag of claim 7, further comprising a piece of permeable material having a first end and a second end, the first end being positioned in communication with the bleeder section of the fluid transfer channel, and the second end being positioned in communication with a preform contained beneath the preform-contact surface.

11. The reusable vacuum bag of claim 10, comprising a piece of impermeable material coupled to the piece of permeable material between the first end and the second end.

12. A reusable vacuum bag including an attachment system for securing the reusable vacuum bag to portions of a base mold surface, the reusable vacuum bag comprising:
 a substantially impermeable elastomeric membrane, the elastomeric membrane having a first surface configured for positioning against a base mold and a preform positioned on the base mold, at least a portion of the first surface defining a preform-contact surface;
 a fluid transfer channel integrally formed on the first surface separate from the preform-contact surface;
 at least one fluid extraction port in communication with the fluid transfer channel, the fluid extraction port being adapted for engagement to a vacuum pump to remove fluids from beneath the elastomeric membrane;
 wherein a section of the elastomeric membrane adjacent to the fluid transfer channel is substantially smooth; and
 wherein one of the fluid transfer channel or the base mold surface has a textured surface adapted to permit the flow of fluid between the elastomeric membrane and the base mold surface when the fluid extraction port is engaged to a vacuum pump such that the elastomeric membrane is secured to the base mold surface.

13. The reusable vacuum bag of claim 12, wherein the elastomeric membrane comprises a natural rubber membrane.

14. The reusable vacuum bag of claim 12, wherein the elastomeric membrane comprises a silicone membrane.

15. The reusable vacuum bag of claim 12, wherein the fluid transfer channel is formed in the first surface of the elastomeric membrane around the preform-contact surface.

16. The reusable vacuum bag of claim 12, wherein the fluid transfer channel comprises an elongated channel formed in the first surface of the elastomeric membrane.

17. The reusable vacuum bag of claim 12, further comprising a fastener configured to couple the elastomeric membrane to the base mold surface.

18. The reusable vacuum bag of claim 17, wherein the fastener comprises a hook-and-loop fastener.

19. The reusable vacuum bag of claim 17, wherein the fastener comprises a slot and key fastener.

\* \* \* \* \*